Jan. 18, 1927.

W. E. STEWART 1,614,807

FASTENING MEANS FOR CLINICAL THERMOMETER CAPS

Filed Sept. 12, 1925

WITNESSES
H. A. LaClair

INVENTOR
W. E. Stewart
BY
ATTORNEYS

Patented Jan. 18, 1927.

1,614,807

UNITED STATES PATENT OFFICE.

WILLIAM EVERTTE STEWART, OF NASHVILLE, TENNESSEE, ASSIGNOR TO EISELE & COMPANY, OF NASHVILLE, TENNESSEE, A CORPORATION OF DELAWARE.

FASTENING MEANS FOR CLINICAL-THERMOMETER CAPS.

Original application filed November 15, 1924, Serial No. 750,165. Divided and this application filed September 12, 1925. Serial No. 56,018.

This invention relates in general to releasing fastening means for securing a cap or the like to a case or similar structure and is especially designed for use in mounting and securing the cap of a clinical thermometer to its case so as to releasably secure or hold the thermometer in the case. The invention is also adapted for embodiment in other similar structures such as fountain pen cases, pencil cases, or the like. The present application is a division of my co-pending application filed Nov. 15, 1924, Serial No. 750,165.

The object of the invention is the provision of a device of this character which eliminates the use of threaded parts thereby avoiding the necessity of tedious manipulation of the cap and case in order to interengage the threaded parts.

A further object is the provision of a releasable fastening device of this character which when embodied in a clinical thermometer case, co-acts with the cap of the case to secure the cap in position while permitting the cap and the thermometer to aline themselves in the case, thereby avoiding scratching, scarring, or breaking the thermometer.

A still further object is to provide a novel form of cap whereby the mounting of the thermometer or other instrument in the cap is facilitated and enhanced.

Figure 1:
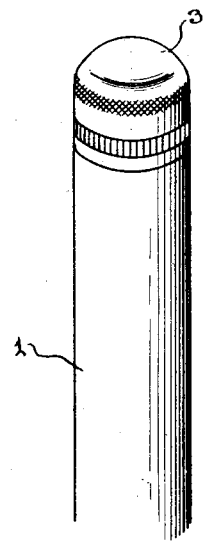
Figure 2:
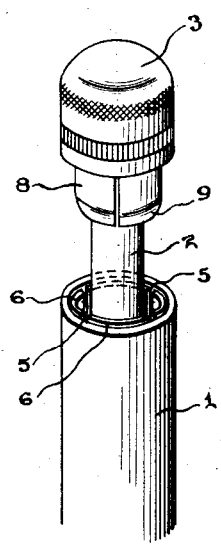
Figure 3:
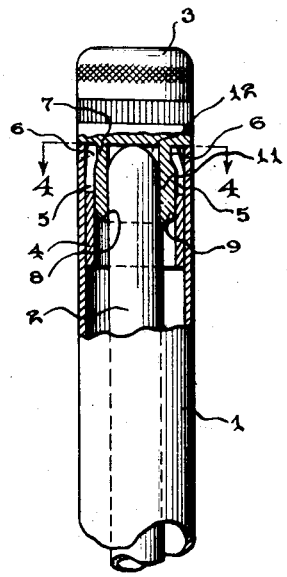
Figure 5:
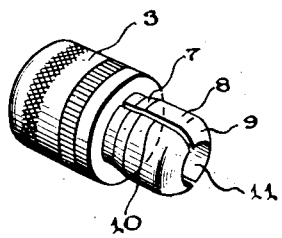
Figure 4:
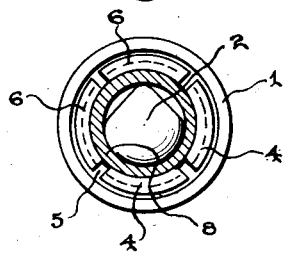
Figure 6:
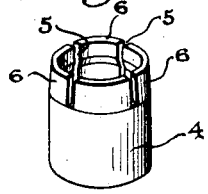

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary perspective view of a clinical thermometer case embodying the present invention and showing the cap applied and releasably held to the case, Figure 2 is a view similar to Figure 1, but showing the cap and thermometer partially withdrawn from the case, Figure 3 is a view partly in elevation and partly in section of the arrangement shown in Figure 1, Figure 4 is a view in section on the line 4—4 of Figure 3, Figure 5 is a detail perspective view of the cap, and Figure 6 is a detail perspective view of the bushing.

Referring to the drawings, and more especially to Figures 3 and 5, the numeral 1 designates a case for a clinical thermometer designated at 2 and carried by a cap 3. Releasable interengaging and holding means is provided for securing the cap 3 to the case 1 and for properly positioning the thermometer 2 in the case, and this means comprises a bushing 4 fitted and secured in the upper open end of the case 1. The bushing 4 is provided with a number of longitudinal slots 5 extending from the outer end of the bushing to points adjacent its center and these slots 5 which occur at spaced angular intervals around the bushing provide flexible sections on the bushing. The flexible sections of the bushing have inwardly deflected marginal edges or portions 6 which provide arcuate spring members designed to engage and fit in a groove 7 provided in a cylindrical member 8 carried by the cap 3, so that the cap will be releasably secured to the bushing and consequently to the case. The forward end of the cylindrical member 8 is rounded off or provided with a camming portion 9 designed to engage the arcuate spring members 6 to cause them to snap into the groove 7. The bushing 4 is of cylindrical form, so that the cylindrical member 8 when fitted therein provides a proper mounting for the cap 3 and thermometer 2. This cylindrical member 8 is a sufficiently loose fit in the bushing 4 to permit the thermometer to properly aline itself in the case 1 thereby preventing breaking of the thermometer. The cylindrical member 8 of the cap is split longitudinally, as indicated at 10, and as this cylindrical member is hollow and is made of resilient material a gripping socket 11 is provided in which the upper end of the thermometer is received and held. The gripping action of the sections of the socket is of itself sufficient to hold the thermometer to the cap and in any event provides for the proper securing of the thermometer since it aids the action of cement should the same be used in spaces 12.

I claim:

1. In a device of the character described, a case, a cap for the case, an instrument carried by the cap, a hollow cylindrical bushing fitted in and secured to one end of the case, a cylindrical member secured to the cap and designed to fit in the bushing and to permit the instrument to aline itself and the cap in and on the case, said cylindrical member having an annular groove in its periphery, said bushing being slotted and having inwardly deflected portions to provide arcuate spring members engageable with the groove.

2. In a device of the character described, a case, a cap for the case, an instrument carried by the cap, a bushing fitting in and secured to one end of the case and having inwardly directed gripping fingers, a member secured to the cap and designed to fit in the bushing and to be engaged and releasably held by said fingers.

3. In a device of the character described, a case, a cap for the case, an instrument carried by the cap and slidable axially into and out of the case, inwardly directed resilient grippers carried by the case, and a cooperating gripper engaging member carried by the carrier and adapted to be slid with the instrument axially into and out of the case to engage with and disengage from the resilient grippers and adapted to be held against axial movement by said resilient grippers when the instrument is slid into the case as far as it may be.

WILLIAM EVERTTE STEWART.